United States Patent
Sekimoto et al.

(10) Patent No.: US 10,372,103 B2
(45) Date of Patent: *Aug. 6, 2019

(54) NUMERICAL CONTROLLER AND MOVEMENT CONTROL METHOD FOR TOOL THAT MAXIMIZES MOVEMENT TORQUE IN A CUTTING FEED

(71) Applicant: FANUC CORPORATION, Yamanashi (JP)

(72) Inventors: Kouji Sekimoto, Yamanashi-ken (JP); Kazuo Sato, Yamanashi-ken (JP); Hideaki Maeda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,882

(22) Filed: Jul. 25, 2017

(65) Prior Publication Data
US 2018/0032053 A1   Feb. 1, 2018

(30) Foreign Application Priority Data
Jul. 28, 2016 (JP) .................................. 2016-147981

(51) Int. Cl.
*G05B 19/402* (2006.01)
*B23Q 15/26* (2006.01)
*G05B 19/408* (2006.01)

(52) U.S. Cl.
CPC .......... *G05B 19/402* (2013.01); *B23Q 15/26* (2013.01); *G05B 19/4086* (2013.01);
(Continued)

(58) Field of Classification Search
CPC .......... G05B 19/19; G05B 2219/35261; G05B 19/402; G05B 19/4086;
(Continued)

(56) References Cited

U.S. PATENT DOCUMENTS 4,617,720 A * 10/1986 Palfery ................. B23Q 1/522
409/221
2015/0105900 A1   4/2015 Maki
(Continued)

FOREIGN PATENT DOCUMENTS

CN    1675601 A    9/2005
CN    104380217 A    2/2015
(Continued)

OTHER PUBLICATIONS

JP 2015055923 A, (Makino Milling Mach Co Ltd), Mar. 23, 2015, (Abstract). [online] [retrive on Mar. 23, 2015]. Retrieved from: ip.com.*

(Continued)

*Primary Examiner* — Thomas C Lee
*Assistant Examiner* — Anzuman Sharmin
(74) *Attorney, Agent, or Firm* — Fredrikson & Byron, P.A.

(57) ABSTRACT

A numerical controller includes: a program analyzing unit to obtain an end point position of a tool; a first angle calculating unit to calculate an inclination angle of a synthetic feeding direction that maximizes a synthetic torque, based on an upper limit movement torque of the tool in each of the two axis directions; a second angle calculating unit to calculate an inclination angle of a cutting feed direction of the tool based on a start point position and the end point position of the tool; a rotation angle calculating unit to calculate a difference between the inclination angle of the synthetic feeding direction and the inclination angle of the cutting feed direction as a rotation angle of a table; and a servo motor control unit to control rotation of the table based on the rotation angle.

8 Claims, 4 Drawing Sheets

(52) U.S. Cl.
CPC ........... *G05B 2219/42289* (2013.01); *G05B 2219/45044* (2013.01); *G05B 2219/49203* (2013.01); *G05B 2219/49295* (2013.01); *G05B 2219/50046* (2013.01)

(58) Field of Classification Search
CPC ........... G05B 2219/42289; G05B 2219/45044; G05B 2219/49203; G05B 2219/49295; G05B 2219/50046; B23Q 15/26
USPC ........................................................ 700/187
See application file for complete search history.

(56) References Cited

U.S. PATENT DOCUMENTS

| | | | |
|---|---|---|---|
| 2016/0103446 A1 | | 4/2016 | Aizawa et al. |
| 2018/0224828 A1* | | 8/2018 | Pitz .................... G05B 19/4068 |

FOREIGN PATENT DOCUMENTS

| | | | | |
|---|---|---|---|---|
| JP | 2013164453 A | * | 8/2013 | |
| JP | 2013187571 A | * | 9/2013 | |
| JP | 201579286 A | | 4/2015 | |
| JP | 201681172 A | | 5/2016 | |

OTHER PUBLICATIONS

JP 2015035021 A, (Mitsubishi Electric Corp), Feb. 19, 2015, (Abstract). [Online] [ retrived on Feb. 19, 2015]. Retrieved from: ip.com.*

Salas et al., Calculus: One and Several Variables, 3rd ed., 1978, John Wiley & Sons, Inc., pp. 577-581.*

Smith, Trigonometry for College Students, Seocnd Edition 1980, Wadsworth, Inc., pp. 148-149.*

English Abstract for Japanese Publication No. 2016-081172 A, published May 16, 2016, 2 pgs.

English Abstract for Japanese Publication No. 2015-079286 A, published Apr. 23, 2015, 1 pg.

English Abstract and Machine Translation for Chinese Publication No. 1675601 A, published Sep. 28, 2005, 12 pgs.

English Abstract and Machine Translation for Chinese Publication No. 104380217 A, published Feb. 25, 2015, 20 pgs.

* cited by examiner

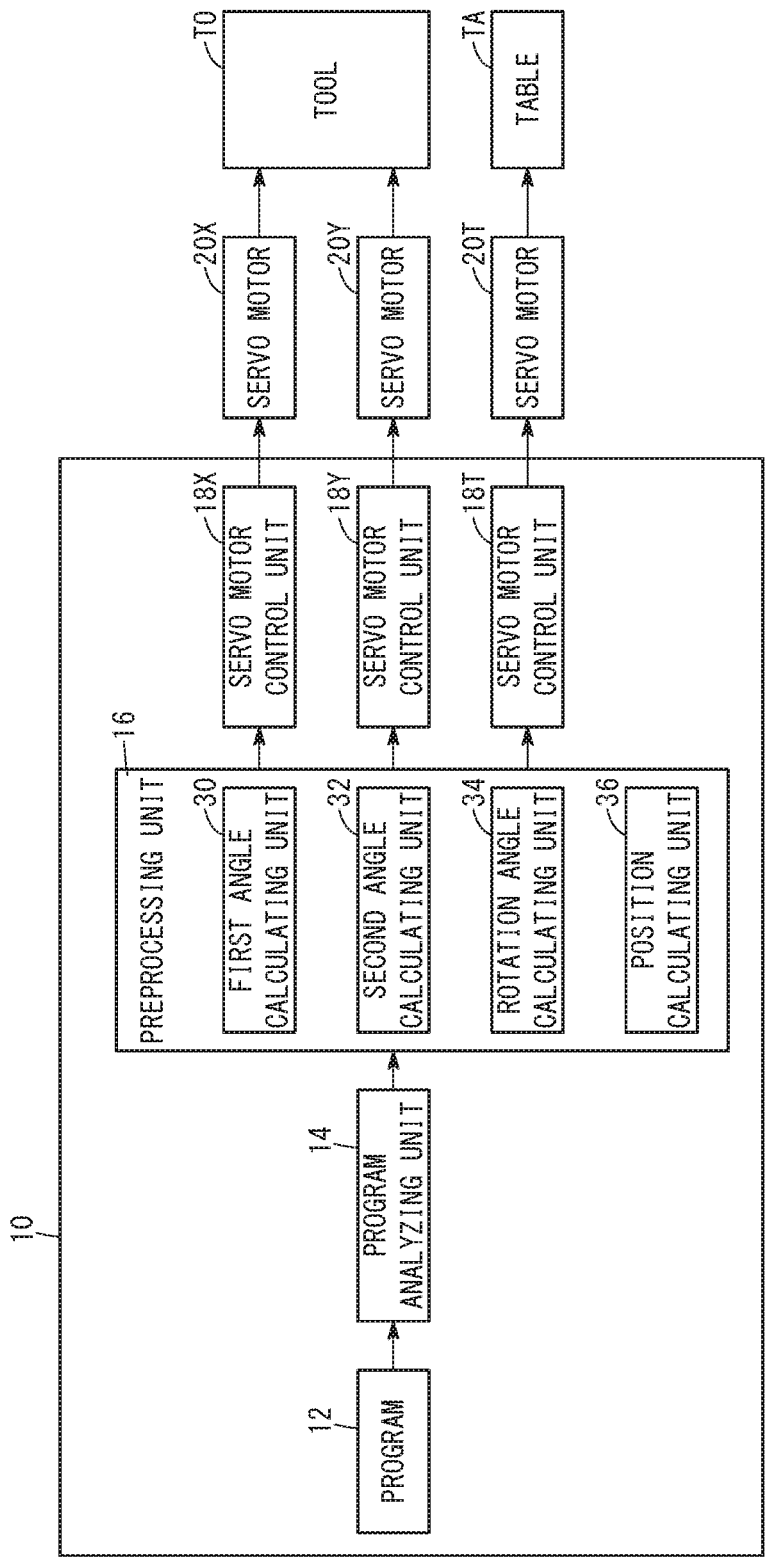

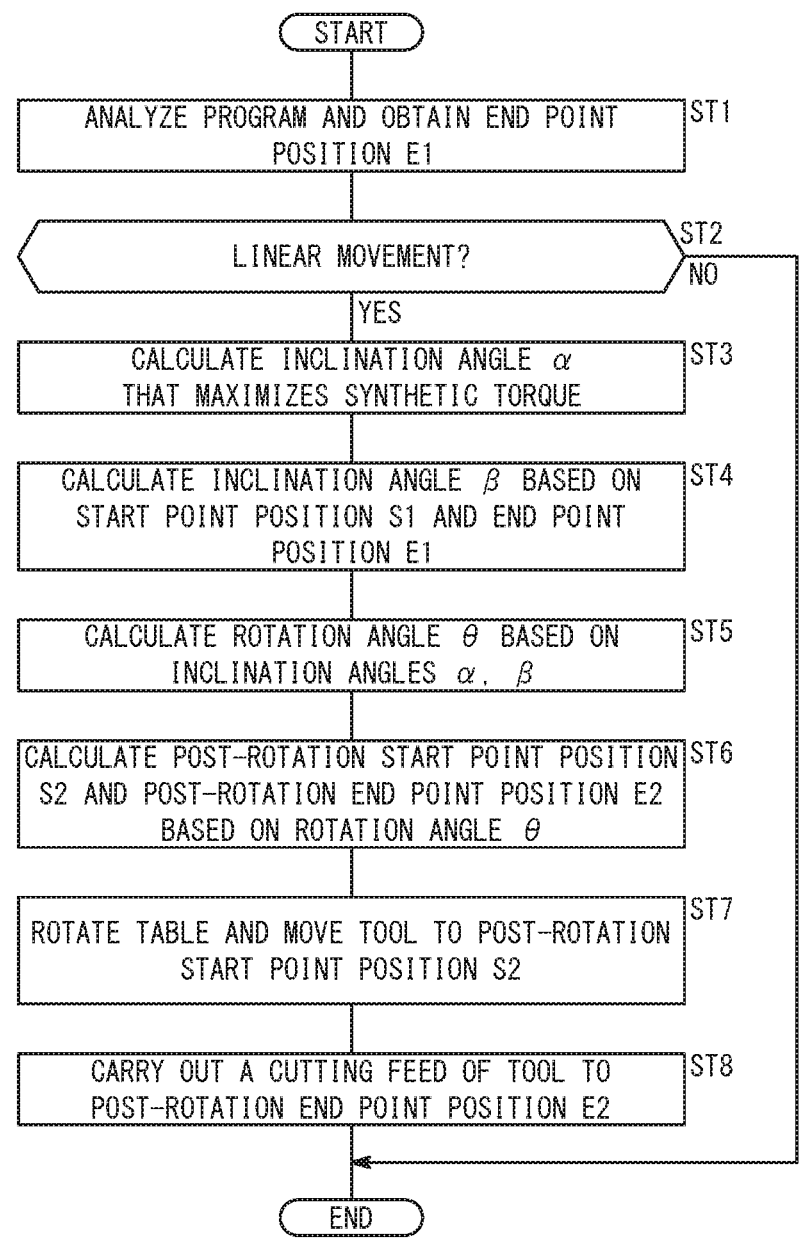

NUMERICAL CONTROLLER AND MOVEMENT CONTROL METHOD FOR TOOL THAT MAXIMIZES MOVEMENT TORQUE IN A CUTTING FEED

CROSS-REFERENCE TO RELATED APPLICATION

This application is based upon and claims the benefit of priority from Japanese Patent Application No. 2016-147981 filed on Jul. 28, 2016, the contents of which are incorporated herein by reference.

BACKGROUND OF THE INVENTION

Field of the Invention

The present invention relates to a numerical controller that controls a cutting feed of a tool, and a movement control method for the tool.

Description of the Related Art

As disclosed in Japanese Laid-Open Patent Publication No. 2016-081172, it is generally known that numerical controllers for controlling machine tools feed the tool for cutting a work by controlling servo motors.

SUMMARY OF THE INVENTION

It is demanded that a tool is moved by a higher torque to increase a depth of cut amount and increase a cutting feedrate during a cutting feed of the tool. However, the torque is at most increased to a maximum torque specified for each axis.

It is therefore an object of the present invention to provide a numerical controller that increases a torque for moving a tool during a cutting feed of the tool, and a movement control method for the tool.

A first aspect of the present invention is a numerical controller that moves a tool based on a program, wherein the tool is configured to machine a work supported on a table and is movable along at least two axis directions orthogonal to each other, and includes: a program analyzing unit configured to analyze the program to obtain an end point position of the tool for a linear cutting feed; a first angle calculating unit configured to calculate an inclination angle of a synthetic feeding direction that maximizes a synthetic torque, based on a predetermined upper limit movement torque of the tool in each of the at least two axis directions; a second angle calculating unit configured to calculate an inclination angle of a cutting feed direction of the tool, based on a start point position and the end point position of the tool; a rotation angle calculating unit configured to calculate a difference between the inclination angle of the synthetic feeding direction and the inclination angle of the cutting feed direction as a rotation angle of the table; and a rotation control unit configured to control rotation of the table about a rotation center position of the table, based on the rotation angle.

According to this configuration, it is possible to use the synthetic torque at maximum, and carry out a cutting feed of the tool by a torque higher than the upper limit movement torque of each axis.

The first aspect of the present invention is the numerical controller and may further include: a position calculating unit configured to calculate a post-rotation start point position rotated at the rotation angle from the start point position about the rotation center position; a first movement control unit configured to control movement of the tool along one of the two axis directions; and a second movement control unit configured to control the movement of the tool along another axis direction, and the first movement control unit and the second movement control unit may be configured to control the movement of the tool to move the tool from the start point position to the post-rotation start point position. Thus, the table is rotated and the start point position is also rotated. Consequently, it is possible to keep a relative positional relationship between a start point position of the tool and the table before rotation.

The first aspect of the present invention is the numerical controller, and the position calculating unit may be configured to calculate a post-rotation end point position rotated at the rotation angle from the end point position about the rotation center position, and after the first movement control unit and the second movement control unit move the tool to the post-rotation start point position and the rotation control unit rotates the table at the rotation angle, the first movement control unit and the second movement control unit may be configured to move the tool to the post-rotation end point position along the synthetic feeding direction. Consequently, it is possible to match the cutting feed direction of the tool that moves from the post-rotation start point position to the post-rotation end point position, with the synthetic feeding direction. Consequently, it is possible to carry out a cutting feed of the tool by a maximum synthetic torque.

The first aspect of the present invention is the numerical controller, and the first angle calculating unit may be configured to calculate an inclination angle α of the synthetic feeding direction according to following equation (1) where τx represents the upper limit movement torque in one of the two axis directions and τy represents the upper limit movement torque in another axis direction, and the second angle calculating unit may be configured to calculate an inclination angle β of the cutting feed direction according to following equation (2) where the known start point position is $(X_{s1}, Y_{s1})$ and the end point position is $(X_{e1}, Y_{e1})$, $$\alpha = \tan^{-1} \frac{\tau y}{\tau x} \quad (1)$$

$$\beta = \tan^{-1} \frac{(Y_{e1} - Y_{s1})}{(X_{e1} - X_{s1})}. \quad (2)$$

Consequently, it is possible to easily calculate the inclination angles α, β.

A second aspect of the present invention is a movement control method for a tool wherein a numerical controller moves the tool based on a program, and wherein the tool is configured to machine a work supported on a table and is movable along at least two axis directions orthogonal to each other, and includes: a program analyzing step of analyzing the program to obtain an end point position of the tool for a linear cutting feed; a first angle calculating step of calculating an inclination angle of a synthetic feeding direction that maximizes a synthetic torque, based on a predetermined upper limit movement torque of the tool in each of the at least two axis directions; a second angle calculating step of calculating an inclination angle of a cutting feed direction of the tool, based on a start point position and the end point position of the tool; a rotation angle calculating step of calculating a difference between the inclination angle of the synthetic feeding direction and the inclination angle of the cutting feed direction as a rotation angle of the table; and a rotation controlling step of controlling rotation of the table about a rotation center position of the table, based on the rotation angle.

According to this configuration, it is possible to use the synthetic torque at maximum, and carry out a cutting feed of the tool by a torque higher than the upper limit movement torque of each axis.

The second aspect of the present invention is the movement control method for the tool, and may include: a first position calculating step of calculating a post-rotation start point position rotated at the rotation angle from the start point position about the rotation center position; and a first movement controlling step of controlling movement of the tool to move the tool from the start point position to the post-rotation start point position. Thus, the table is rotated and the start point position is also rotated. Consequently, it is possible to keep a relative positional relationship between a start point position of the tool and the table before rotation.

The second aspect of the present invention is the movement control method for the tool, and may further include: a second position calculating step of calculating a post-rotation end point position rotated at the rotation angle from the end point position about the rotation center position; and a second movement controlling step of moving the tool to the post-rotation end point position along the synthetic feeding direction after the tool is moved to the post-rotation start point position in the first movement controlling step and the table is rotated at the rotation angle in the rotation controlling step. Consequently, it is possible to match the cutting feed direction of the tool that moves from the post-rotation start point position to the post-rotation end point position, with the synthetic feeding direction. Consequently, it is possible to carry out a cutting feed of the tool by a maximum synthetic torque.

The second aspect of the present invention is the movement control method for the tool, and, in the first angle calculating step, an inclination angle $\alpha$ of the synthetic feeding direction may be calculated according to following equation (1) where $\tau x$ represents the upper limit movement torque in one of the two axis directions and $\tau y$ represents the upper limit movement torque in another axis direction, and, in the second angle calculating step, an inclination angle $\beta$ of the cutting feed direction may be calculated according to following equation (2) where the known start point position is $(X_{s1}, Y_{s1})$ and the end point position is $(X_{e1}, Y_{e1})$, $$\alpha = \tan^{-1} \frac{\tau y}{\tau x} \quad (1)$$

$$\beta = \tan^{-1} \frac{(Y_{e1} - Y_{s1})}{(X_{e1} - X_{s1})}. \quad (2)$$

Consequently, it is possible to easily calculate the inclination angles $\alpha$, $\beta$.

According to the present invention, it is possible to use a synthetic torque at maximum and carry out a cutting feed of the tool by a torque higher than the upper limit movement torque of each axis.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a configuration diagram of a numerical controller according to the present embodiment;

FIG. 4 is a flowchart showing an operation of the numerical controller.

DESCRIPTION OF THE PREFERRED EMBODIMENTS

A preferred embodiment of a numerical controller and a movement control method for a tool according to the present invention will be described in detail below with reference to the accompanying drawings.

The numerical controller according to the present embodiment moves a tool that machines a work supported on a table based on a program. This tool is movable along three axis directions orthogonal to each other. These three axis directions are respectively denoted as an X axis direction, a Y axis direction and a Z axis direction. In this regard, the present embodiment describes an example where the tool is moved on an XY plane for convenience of explanation.

First, a drawback of conventional cutting feed will be described. Then, an outline of cutting feed according to the present embodiment will be described. Subsequently, the numerical controller according to the present embodiment will be described in detail.

<Drawback of Conventional Cutting Feed and Outline of Cutting Feed According to Present Embodiment>

Figure 1A:
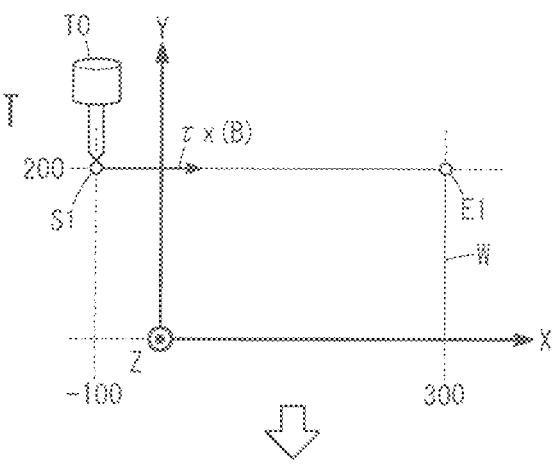
FIG. 1A is a view for explaining conventional cutting feed.

As shown in FIG. 1A, a linear cutting feed (move) is carried out by a tool TO located at a start point position S1 (coordinates (x, y)=(−100, 200)) to an end point position E1 (coordinates (x, y)=300, 200)) along a +X axis direction. In this case, the tool TO cannot be moved by a torque more than an upper limit movement torque $\tau x$ of the tool TO in the X axis direction. A direction (the +X direction in FIG. 1A) in which the tool TO moves from the start point position S1 to the end point position E1 will be referred to as a cutting feed direction B of the tool TO.

The tool TO is movable in the Y axis direction, too. Consequently, by moving the tool TO by an upper limit movement torque $\tau y$ in the Y axis direction while moving the tool TO at the upper limit movement torque $\tau x$ in the X axis direction, it is possible to move the tool TO by a torque more than the upper limit movement torque $\tau x$. A synthetic torque for moving the tool TO by the upper limit movement torques $\tau x$, $\tau y$ will be referred to as a synthetic torque $\tau c$. A linear direction in which the tool TO is moved by the maximum synthetic torque $\tau c$ will be referred to as a synthetic feeding direction A (see FIG. 1B).

When the tool TO at the start point position S1 is moved along the synthetic feeding direction A, the tool TO cannot naturally reach the end point position E1. However, the start point position S1 and the end point position E1 are determined according to a relative positional relationship with a table (work W). Therefore, by rotating the table (work W), the start point position S1 and the end point position E1 about a rotation center position (a Z axis in FIGS. 1A to 1C) on the XY plane to match the cutting feed direction B and the synthetic feeding direction A, it is possible to keep the relative positional relationship between the tool TO and the table (work W).

Figure 1B:
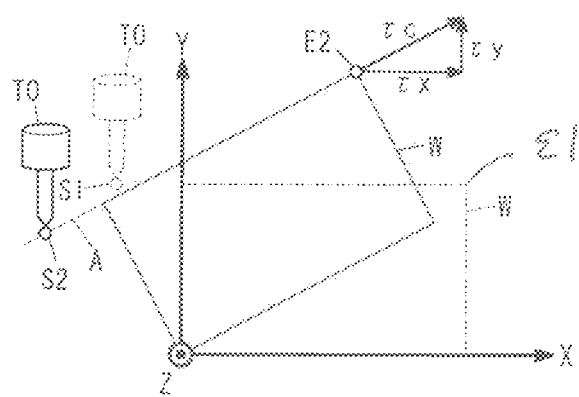
FIGS. 1B and 1C are views for explaining an outline of cutting feed according to the present embodiment.

That is, as shown in FIG. 1B, the start point position S1, the end point position E1 and the table (work W) are rotated at a predetermined angle about the rotation center position (Z axis) of the table (work W) to locate the start point position S1 after rotation (referred to as a post-rotation start point position S2 below) and the end point position E1 after rotation (referred to as a post-rotation end point position E2 below) in the synthetic feeding direction A. Thus, the relative positional relationship between the table (work W), the start point position S1 and the end point position E1 before rotation of the table (work W), matches with a relative positional relationship between the table (work W), the post-rotation start point position S2 and the post-rotation end point position E2 after rotation of the table (work W).

Figure 1C:
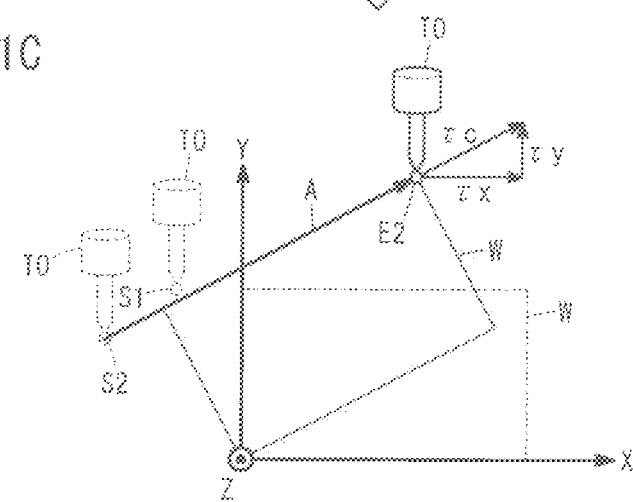

Subsequently, as shown in FIG. 1C, by cutting feed of the tool TO located at the post-rotation start point position S2 to the post-rotation end point position E2 along the synthetic feeding direction A, it is possible to maximize the movement torque (synthetic torque) of the tool TO.

FIGS. 1A to 1C show examples where linear cutting feeds are carried out by the tool TO in a uniaxial direction (X axis direction). However, the present invention is also applicable to a case of moving the tool TO in multiple axis directions (the X axis direction and the Y axis direction) for a linear cutting feed of the tool TO as a result. That is, even when the tool TO is moved in the X axis direction and the Y axis direction, the synthetic torque does not necessarily match with the maximum synthetic torque τC.

<Explanation of Numerical Controller 10 According to Present Embodiment>

FIG. 2 is a configuration diagram of a numerical controller 10 according to the present embodiment. The elements in FIG. 2 and subsequent drawings, which are similar to the elements having reference numerals in FIGS. 1A to 1C will be described using the same reference numerals. Although not shown, the numerical controller 10 includes a processor such as a CPU and a storage medium in which basic programs are stored. The processor executes the basic programs to function as the numerical controller 10 according to the present embodiment. Although not shown, the numerical controller 10 includes as well an input unit that an operator can operate to input information and a command, and a display unit that displays the information, and the like.

The numerical controller 10 includes a program 12, a program analyzing unit 14, a preprocessing unit 16 and servo motor control units 18X, 18Y, 18T. A servo motor 20X is a motor that moves the tool TO in the X axis direction, and a servo motor 20Y is a motor that moves the tool TO in the Y axis direction. A servo motor 20T is a servo motor that rotates a table TA that supports the work W about a rotation center position O of the table TA on the XY plane. The X axis direction, the Y axis direction and the Z axis direction are orthogonal to each other.

The numerical controller 10 includes a preset XYZ coordinate system, and recognizes a position of the tool TO and a position of the table TA based on this XYZ coordinate system. The XYZ coordinate system expresses an actual position of a machine (the tool TO or the table TA) on a coordinate system. Hence, the X axis direction and the Y axis direction of the XYZ coordinate system match with the X axis direction and the Y axis direction in which the tool TO actually moves. The Z axis direction of the XYZ coordinate system passes on the rotation center position O of the table TA. Thus, a position of an origin on the XY plane of the XYZ coordinate system is the rotation center position O.

The program 12 is stored in the storage medium of the numerical controller 10, and in which a program for at least cutting feed of the tool TO is described. The program analyzing unit 14 analyzes the program 12 to obtain the end point position E1 of the tool TO as a command value. This end point position E1 is a position based on the XYZ coordinate system. The end point position E1 obtained by the program analyzing unit 14 is outputted to the preprocessing unit 16.

A coordinate position of the end point position E1 is expressed as $(X_{e1}, Y_{e1})$. A coordinate position of the start point position (the current position of the tool TO) S1 is expressed as $(X_{s1}, Y_{s1})$. This start point position S1 $(X_{s1}, Y_{s1})$ is known. The position $X_{e1}$ and the position $X_{s1}$ are the positions on an X axis of the XYZ coordinate system. The position $Y_{e1}$ and the position $Y_{s1}$ are the positions on a Y axis of the XYZ coordinate system.

The preprocessing unit 16 calculates an inclination angle α of the synthetic feeding direction A that maximizes the synthetic torque, based on the upper limit movement torque τx in the X axis direction and the upper limit movement torque τy in the Y axis direction. The preprocessing unit 16 calculates an inclination angle β of the cutting feed direction B of the tool TO that moves from the start point position S1 to the end point position E1. The preprocessing unit 16 calculates the start point position S1 $(X_{s1}, Y_{s1})$, the end point position E1 $(X_{e1}, Y_{e1})$ and a rotation angle θ of the table TA such that the cutting feed direction B matches with (is overlaid on) the synthetic feeding direction A by using the inclination angles α, β.

That is, the rotation angle θ is an angle at which the start point position S1 $(X_{s1}, Y_{s1})$, the end point position E1 $(X_{e1}, Y_{e1})$ and the table TA are rotated about the rotation center position O (i.e., about the Z axis) so as to locate the start point position S1 $(X_{s1}, Y_{s1})$ and the end point position E1 $(X_{e1}, Y_{e1})$ in the synthetic feeding direction A. In this regard, a position rotated at the rotation angle θ from the start point position S1 $(X_{s1}, Y_{s1})$ will be referred to as the post-rotation start point position S2. A coordinate position of the post-rotation start point position S2 is expressed as $(X_{s2}, Y_{s2})$. Further, a position rotated at the rotation angle θ from the end point position E1 $(X_{e1}, Y_{e1})$ will be referred to as the post-rotation end point position E2. A coordinate position of the post-rotation end point position E2 is expressed as $(X_{e2}, Y_{e2})$. The position $X_{e2}$ and the position $X_{s2}$ are positions on the X axis of the XYZ coordinate system. The position $Y_{e2}$ and the position $Y_{s2}$ are positions on the Y axis of the XYZ coordinate system.

Figure 3:
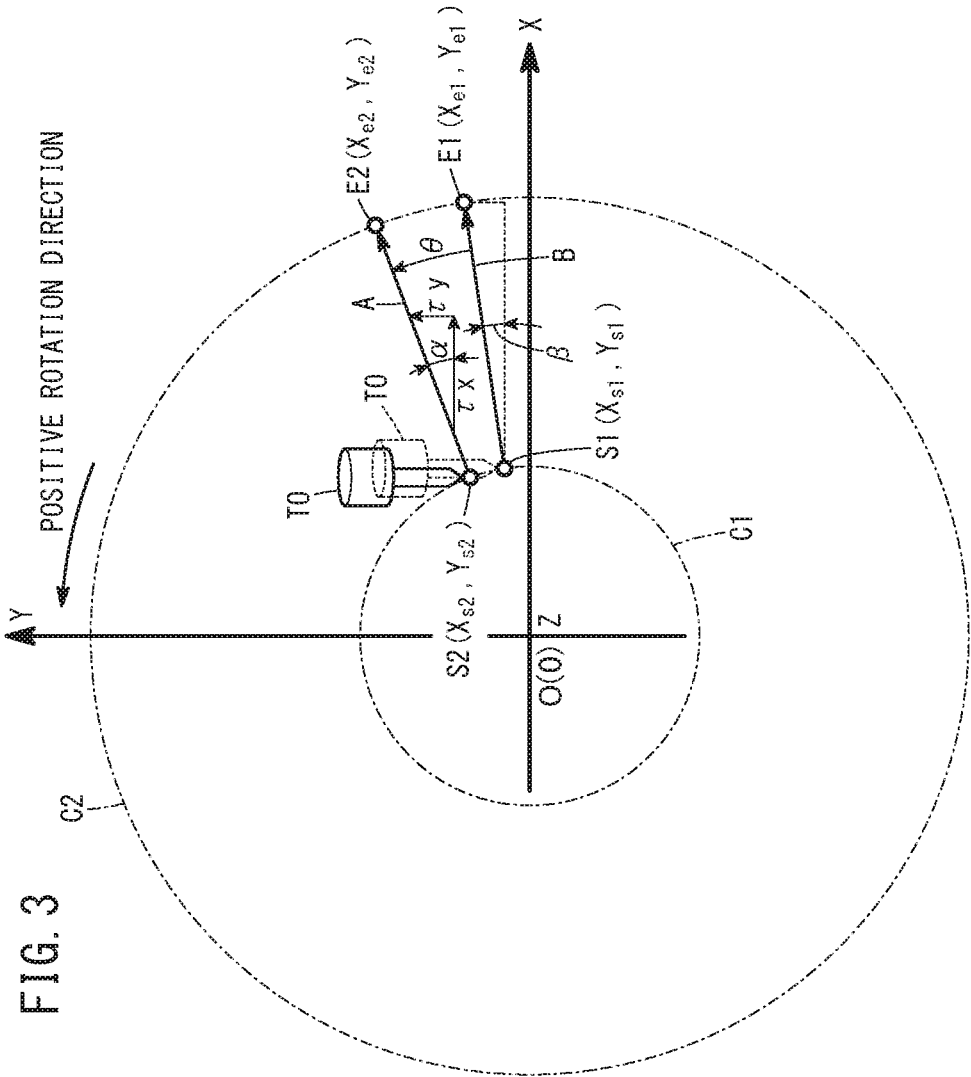
FIG. 3 is a view for explaining a configuration of each unit of a preprocessing unit shown in FIG. 2.

The preprocessing unit 16 will be more specifically described below with reference to FIG. 3, too. The preprocessing unit 16 includes a first angle calculating unit 30, a second angle calculating unit 32, a rotation angle calculating unit 34 and a position calculating unit 36.

The first angle calculating unit 30 calculates the inclination angle α of the synthetic feeding direction A that maximizes the synthetic torque, based on the predetermined upper limit movement torques (vectors) τx, τy of the tool TO of the respective X axis direction and Y axis direction. The first angle calculating unit 30 calculates the inclination angle α by using following equation (3). In this regard, the inclination angle α is an inclination angle with respect to a direction parallel to the X axis direction.

$$\alpha = \tan^{-1}\frac{\tau y}{\tau x} \quad (3)$$

The upper limit movement torques τx, τy may be maximum movement torques by which the tool TO can be moved by the servo motors 20X, 20Y or may be movement torques determined in advance by the operator.

The second angle calculating unit 32 calculates the inclination angle β of the cutting feed direction B of the tool TO that moves from the start point position S1 ($X_{s1}$, $Y_{s1}$) to the end point position E1 ($X_{e1}$, $Y_{e1}$) based on the start point position S1 ($X_{s1}$, $Y_{s1}$) and the end point position E1 ($X_{e1}$, $Y_{e1}$). The second angle calculating unit 32 calculates the inclination angle β by using following equation (4). In this regard, the inclination angle β is an inclination angle with respect to a direction parallel to the X axis direction.

$$\beta = \tan^{-1}\frac{(Y_{e1} - Y_{s1})}{(X_{e1} - X_{s1})} \quad (4)$$

The rotation angle calculating unit 34 calculates the start point position S1 ($X_{s1}$, $Y_{s1}$), the end point position E1 ($X_{e1}$, $Y_{e1}$) and the rotation angle θ of the table TA based on the inclination angles α, β. The rotation angle calculating unit 34 calculates a difference between the inclination angle α and the inclination angle β as the rotation angle θ. As shown in FIG. 3, when a leftwise direction (counterclockwise direction) about the rotation center position O is a positive direction, the rotation angle calculating unit 34 may calculate the rotation angle θ by subtracting the inclination angles α from the inclination angle β. In this case, the rotation angle θ has a relationship of θ=β−α. By contrast with this, when a rightwise direction (clockwise direction) about the rotation center position O is the positive direction, the rotation angle calculating unit 34 may calculate the rotation angle θ by subtracting the inclination angles β from the inclination angle α. In this case, the rotation angle θ has a relationship of θ=α−β.

The position calculating unit 36 calculates the post-rotation start point position S2 ($X_{s2}$, $Y_{s2}$) and the post-rotation end point position E2 ($X_{e2}$, $Y_{e2}$) based on the rotation angle θ. The position calculating unit 36 calculates as the post-rotation start point position S2 ($X_{s2}$, $Y_{s2}$) a position rotated at the rotation angle θ from the start point position S1 ($X_{s1}$, $Y_{s1}$) about the rotation center position O of the table TA (about the Z axis). As is clear from FIG. 3, the start point position S1 ($X_{s1}$, $Y_{s1}$) and the post-rotation start point position s2 ($X_{s2}$, $Y_{s2}$) locate on a circle C1 about the rotation center position O.

The position calculating unit 36 calculates as the post-rotation end point position E2 ($X_{e2}$, $Y_{e2}$) a position rotated at the rotation angle θ from the end point position E1 ($X_{e1}$, $Y_{e1}$) about the rotation center position O of the table TA (about the Z axis). As is clear from FIG. 3, the end point position E1 ($X_{e1}$, $Y_{e1}$) and the post-rotation end point position E2 ($X_{e2}$, $Y_{e2}$) locate on a circle C2 about the rotation center position O.

The preprocessing unit 16 outputs the positions $X_{s2}$, $X_{e2}$ of the post-rotation start point position S2 ($X_{s2}$, $Y_{s2}$) and the post-rotation end point position E2 ($X_{e2}$, $Y_{e2}$) on the X axis to the servo motor control unit (first movement control unit) 18X, and the positions $Y_{s2}$, $Y_{e2}$ on the Y axis to the servo motor control unit (second movement control unit) 18Y. The preprocessing unit 16 outputs the calculated rotation angle θ to the servo motor control unit (rotation control unit) 18T.

The servo motor control unit 18X controls the servo motor 20X to move the tool TO from the position $X_{s1}$ to the position $X_{s2}$. The servo motor control unit 18Y controls the servo motor 20Y to move the tool TO from the position $Y_{s1}$ to the position $Y_{s2}$. Thus, as shown in FIG. 1B, the tool TO moves from the start point position S1 ($X_{s1}$, $Y_{s1}$) to the post-rotation start point position S2 ($X_{s2}$, $Y_{s2}$). As shown in FIG. 1B, the servo motor control unit 18T controls the servo motor 20T to rotate the table TA about the rotation center position O (about the Z axis).

Hence, as shown in FIGS. 1A and 1B, a relative positional relationship between the start point position S1 (post-rotation start point position S2) of the tool TO after rotation and the table TA (work W) after rotation is the same as the relative positional relationship between the start point position S1 of the tool TO before rotation and the table TA (work W) before rotation. Similarly, the relative positional relationship between the end point position E1 (post-rotation end point position E2) of the tool TO after rotation and the table TA (work W) after rotation is also the same as the relative positional relationship between the end point position E1 of the tool TO before rotation and the table TA (work W) before rotation. The cutting feed direction of the tool TO moving from the post-rotation start point position S2 ($X_{s2}$, $Y_{s2}$) to the post-rotation end point position E2 ($X_{e2}$, $Y_{e2}$) matches with the synthetic feeding direction A.

Subsequently, the servo motor control unit 18X controls the servo motor 20X to move the tool TO from the position $X_{s2}$ to the position $X_{e2}$ by the upper limit movement torque τx. The servo motor control unit 18Y controls the servo motor 20Y to move the tool TO from the position $Y_{s2}$ to the position $Y_{e2}$ by the upper limit movement torque τy. Thus, the tool TO linearly moves from the post-rotation start point position S2 ($X_{s2}$, $Y_{s2}$) to the post-rotation end point position E2 ($X_{e2}$, $Y_{e2}$) by the maximum synthetic torque τC along the synthetic feeding direction A. Consequently, it is possible to carry out a cutting feed of the tool TO in a state of a maximized movement torque of the tool TO.

Next, an operation of the numerical controller 10 will be described with reference to a flowchart shown in FIG. 4. In step ST1, the program analyzing unit 14 analyzes the program 12 to obtain the end point position E1 ($X_{e1}$, $Y_{e1}$) of the tool TO.

Next, in step ST2, the program analyzing unit 14 analyzes the program 12 to determine whether or not this cutting feed is linear movement. When it is determined in step ST2 that the cutting feed is not the linear movement, this operation is finished. When it is determined in step ST2 that the cutting feed is the linear movement, the flow moves to step ST3.

When the flow moves to step ST3, the first angle calculating unit 30 calculates the inclination angle α of the synthetic feeding direction A that maximizes the synthetic torque. The first angle calculating unit 30 calculates the inclination angle α based on the upper limit movement torque τx in the X axis direction and the upper limit movement torque τy in the Y axis direction by using equation (3). These upper limit movement torques τx, τy are predetermined torques.

Next, in step ST4, the second angle calculating unit 32 calculates the inclination angle β of the cutting feed direction B of the tool TO that moves from the start point position S1 ($X_{s1}$, $Y_{s1}$) to the end point position E1 ($X_{e1}$, $Y_{e1}$) based on the start point position S1 ($X_{s1}$, $Y_{s1}$) and the end point position E1 ($X_{e1}$, $Y_{e1}$). The second angle calculating unit 32 calculates the inclination angle β based on the start point position S1 ($X_{s1}$, $Y_{s1}$) and the end point position E1 ($X_{e1}$, $Y_{e1}$) by using equation (4).

Next, in step ST5, the rotation angle calculating unit 34 calculates the rotation angle θ based on the inclination angle α calculated in step ST3 and the inclination angle β calculated in step ST4. The rotation angle calculating unit 34 calculates the rotation angle θ by calculating the difference between the inclination angle α and the inclination angle β.

Next, in step ST6, the position calculating unit 36 calculates the post-rotation start point position S2 ($X_{s2}$, $Y_{s2}$) and the post-rotation end point position E2 ($X_{s2}$, $Y_{e2}$) based on the rotation angle θ calculated in step ST5. The post-rotation start point position S2 ($X_{s2}$, $Y_{s2}$) is a position rotated at the rotation angle θ from the start point position S1 ($X_{s1}$, $Y_{s1}$) about the rotation center position O of the table TA (about the Z axis). The post-rotation end point position E2 ($X_{e2}$, $Y_{e2}$) is a position rotated at the rotation angle θ from the end point position E1 ($X_{e1}$, $Y_{e1}$) about the rotation center position O of the table TA (about the Z axis).

Next, in step ST7, the servo motor control unit 18T controls the servo motor 20T to rotate the table TA at the rotation angle θ calculated in step ST5 about the rotation center position O (about the Z axis). At the same time as this rotation, the servo motor control units 18X, 18Y control the servo motors 20X, 20Y to move the tool TO from the start point position S1 ($X_{s1}$, $Y_{s1}$) to the post-rotation start point position S2 ($X_{s2}$, $Y_{s2}$).

Next, in step ST8, the servo motor control units 18X, 18Y control the servo motors 20X, 20Y to move the tool TO from the post-rotation start point position S2 ($X_{s2}$, $Y_{s2}$) to the post-rotation end point position E2 ($X_{s2}$, $Y_{e2}$) along the synthetic feeding direction A. Consequently, it is possible to carry out a linear cutting feed of the tool TO by the maximum synthetic torque τc.

The above embodiment has described rotating the table TA on the two-dimensional XY plane of the X axis and the Y axis for ease of description. However, the table TA may be three-dimensionally rotated based on the same principal. That is, the table TA may be rotated on the XY plane, a XZ plane and a YZ plane.

In this case, the inclination angle α of the synthetic feeding direction A that maximizes the synthetic torque is calculated based on the upper limit movement torque τx in the X axis direction, the upper limit movement torque τy in the Y axis direction, and an upper limit movement torque τz in the Z axis direction. More specifically, the inclination angle α (αxy) of the synthetic feeding direction A on the XY plane is calculated based on the upper limit movement torques τx, τy as described above. Similarly, the inclination angle α (αxz) of the synthetic feeding direction A on the XZ plane is calculated based on the upper limit movement torques τx, τx. The inclination angle α (αyz) of the synthetic feeding direction A on the YZ plane is calculated based on the upper limit movement torques τy, τz.

The inclination angles (βxy, βxz, βyz) of the cutting feed direction B of the tool TO that moves from the start point positions S1 ($X_{s1}$, $Y_{s1}$, $Z_{s1}$) to the end point positions E1 ($X_{e1}$, $Y_{e1}$, $Z_{e1}$) are calculated for the XY plane, the XZ plane and the YZ plane, respectively. Further, the rotation angles θ (θxy, θxz, θyz) for the respective planes are calculated based on the inclination angles α (αxy, αxz, αyz), β (βxy, βxz, βyz) on the respective planes. The post-rotation start point positions S2 ($X_{s2}$, $Y_{s2}$, $Z_{s2}$) and the post-rotation end point positions E2 ($X_{e2}$, $Y_{e2}$, $Z_{e2}$) are calculated based on the rotation angles θ of these planes.

The numerical controller 10 according to the above embodiment moves the tool TO that machines the work W supported on the table TA and is movable along at least the two axis directions orthogonal to each other, based on the program 12. The numerical controller 10 includes the program analyzing unit 14 that analyzes the program 12 to obtain the end point position E1 of the tool TO for a linear cutting feed, the first angle calculating unit 30 that calculates the inclination angle α of the synthetic feeding direction A that maximizes the synthetic torque, based on a predetermined upper limit movement torque of the tool TO in each of the at least two axis directions, the second angle calculating unit 32 that calculates the inclination angle β of the cutting feed direction B of the tool TO based on the start point position S1 and the end point position E1 of the tool TO, the rotation angle calculating unit 34 that calculates the difference between the inclination angle α of the synthetic feeding direction A and the inclination angle β of the cutting feed direction B as the rotation angle θ of the table TA, and the servo motor control unit 18T that controls rotation of the table TA about the rotation center position O of the table TA, based on the rotation angle θ.

Consequently, it is possible to use the synthetic torque at maximum, and carry out a cutting feed of the tool TO by a torque higher than the upper limit movement torque in each axis.

The numerical controller 10 includes the position calculating unit 36 that calculates the post-rotation start point position S2 rotated at the rotation angle θ from the start point position S1 about the rotation center position O, and the servo motor control unit 18X that controls movement of the tool TO along one of the two axis directions, and the servo motor control unit 18Y that controls the movement of the tool TO along another axis direction. The servo motor control unit 18X and the servo motor control unit 18Y control the movement of the tool TO to move the tool TO from the start point position S1 to the post-rotation start point position S2. Consequently, the table TA is rotated and the start point position S1 is also rotated. Consequently, it is possible to keep the relative positional relationship between the start point position S1 of the tool and the table TA before rotation.

The position calculating unit 36 calculates the post-rotation end point position E2 rotated at the rotation angle θ from the end point position E1 about the rotation center position O. The servo motor control units 18X, 18Y move the tool TO to the post-rotation start point position S2. The servo motor control unit 18T rotates the table TA at the rotation angle θ. Thereafter, the servo motor control units 18X, 18Y move the tool TO to the post-rotation end point position E2 along the synthetic feeding direction A. Consequently, it is possible to match the cutting feed direction of the tool TO that moves from the post-rotation start point position S2 to the post-rotation end point position E2, with the synthetic feeding direction A. Consequently, it is possible to carry out a cutting feed of the tool TO by the maximum synthetic torque τc.

The first angle calculating unit 30 calculates the inclination angle α of the synthetic feeding direction A according to above equation (3) where τx represents the upper limit movement torque in one of the two axis directions and τy represents the upper limit movement torque in the other axis direction. The second angle calculating unit 32 calculates the inclination angle β of the cutting feed direction B according to above equation (4) where the known current start point position S1 of the tool TO is ($X_{s1}$, $Y_{s1}$) and the end point position E1 is $(X_{e1}, Y_{e1})$. Consequently, it is possible to easily calculate the inclination angles α, β.

While the invention has been particularly shown and described with reference to embodiments, it will be understood that variations and modifications can be effected thereto without departing from the scope of the invention as defined by the appended claims.

What is claimed is:

1. A numerical controller that moves a tool based on a program stored in a storage medium of the numerical controller, the tool being configured to machine a work supported on a table having a rotation center position and being movable along at least two axis directions orthogonal to each other, the numerical controller comprising:
   a program analyzing processor configured to obtain, from the program, an end point position of the tool for a linear cutting feed;
   a first angle calculating processor configured to calculate an inclination angle of a synthetic feeding direction that maximizes a synthetic torque of the tool, based on a predetermined upper limit movement torque of the tool in each of the at least two axis directions;
   a second angle calculating processor configured to calculate an inclination angle of a cutting feed direction of the tool, based on a start point position and the end point position of the tool;
   a rotation angle calculating processor configured to calculate a difference between the inclination angle of the synthetic feeding direction and the inclination angle of the cutting feed direction as a rotation angle of the table; and
   a rotation control processor configured to control rotation of the table about the rotation center position of the table, based on the rotation angle so that the tool is able to perform a cutting feed at a maximum movement torque of the tool wherein the maximum movement torque is based on a predetermined upper limit movement torque of the tool in each of the at least two axis directions.

2. The numerical controller according to claim 1, further comprising:
   a position calculating processor configured to calculate a post-rotation start point position rotated at the rotation angle from the start point position about the rotation center position;
   a first movement control processor configured to control movement of the tool along one of the two axis directions; and
   a second movement control processor configured to control the movement of the tool along another axis direction,
   wherein the first movement control processor and the second movement control processor are configured to control the movement of the tool to move the tool from the start point position to the post-rotation start point position.

3. The numerical controller according to claim 2, wherein:
   the position calculating processor is configured to calculate a post-rotation end point position rotated at the rotation angle from the end point position about the rotation center position; and
   after the first movement control processor and the second movement control processor move the tool to the post-rotation start point position and the rotation control processor rotates the table at the rotation angle, the first movement control processor and the second movement control processor are configured to move the tool to the post-rotation end point position along the synthetic feeding direction.

4. The numerical controller according to claim 1, wherein:
   the first angle calculating processor is configured to calculate an inclination angle α of the synthetic feeding direction according to following equation (1) where τx represents the upper limit movement torque in one of the two axis directions and τy represents the upper limit movement torque in another axis direction; and
   the second angle calculating processor is configured to calculate an inclination angle β of the cutting feed direction according to following equation (2) where the known start point position is $(X_{s1}, Y_{s1})$ and the end point position is $(X_{e1}, Y_{e1})$, $$\alpha = \tan^{-1}\frac{\tau y}{\tau x} \quad (1)$$

$$\beta = \tan^{-1}\frac{(Y_{e1} - Y_{s1})}{(X_{e1} - X_{s1})}. \quad (2)$$

5. A movement control method for a tool wherein a numerical controller moves the tool based on a program stored in a storage medium of the numerical controller, the tool being configured to machine a work supported on a table having a rotation center position and being movable along at least two axis directions orthogonal to each other, the movement control method comprising:
   obtaining an end point position of the tool for a linear cutting feed;
   calculating an inclination angle of a synthetic feeding direction that maximizes a synthetic torque, based on a predetermined upper limit movement torque of the tool in each of the at least two axis directions;
   calculating an inclination angle of a cutting feed direction of the tool, based on a start point position and the end point position of the tool;
   calculating a difference between the inclination angle of the synthetic feeding direction and the inclination angle of the cutting feed direction as the rotation angle of the table; and
   controlling rotation of the table about a rotation center position of the table, based on the rotation angle so that the tool is able to perform a cutting feed at a maximum movement torque of the tool wherein the maximum movement torque is based on a predetermined upper limit movement torque of the tool in each of the at least two axis directions.

6. The movement control method for the tool according to claim 5, further comprising:
   a first position calculating step of calculating a post-rotation start point position rotated at the rotation angle from the start point position about the rotation center position; and
   a first movement controlling step of controlling movement of the tool to move the tool from the start point position to the post-rotation start point position.

7. The movement control method for the tool according to claim 6, further comprising:
   a second position calculating step of calculating a post-rotation end point position rotated at the rotation angle from the end point position about the rotation center position; and
   a second movement controlling step of moving the tool to the post-rotation end point position along the synthetic feeding direction after the tool is moved to the post-rotation start point position in the first movement controlling step and the table is rotated at the rotation angle in the rotation controlling step.

8. The movement control method for the tool according to claim 5, wherein:
in the first angle calculating step, an inclination angle α of the synthetic feeding direction is calculated according to following equation (1) where τx represents the upper limit movement torque in one of the two axis directions and τy represents the upper limit movement torque in another axis direction; and
in the second angle calculating step, an inclination angle β of the cutting feed direction is calculated according to following equation (2) where the known start point position is $(X_{s1}, Y_{s1})$ and the end point position is $(X_{e1}, Y_{e1})$, $$\alpha = \tan^{-1}\frac{\tau y}{\tau x} \quad (1)$$

$$\beta = \tan^{-1}\frac{(Y_{e1} - Y_{s1})}{(X_{e1} - X_{s1})}. \quad (2)$$

* * * * *